United States Patent
DeGuiseppi et al.

(10) Patent No.: US 7,217,314 B2
(45) Date of Patent: May 15, 2007

(54) VENTING SYSTEM FOR MINIMIZING CONDENSATION IN A LIGHTING ASSEMBLY

(75) Inventors: David T. DeGuiseppi, Chadds Ford, PA (US); Kerry L. DeWitt, Oxford, PA (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/032,329

(22) Filed: Jan. 10, 2005

(65) Prior Publication Data

US 2006/0150817 A1 Jul. 13, 2006

(51) Int. Cl.
*F21V 31/03* (2006.01)
*B01D 53/26* (2006.01)

(52) U.S. Cl. .................. 95/117; 96/134; 362/294; 362/547

(58) Field of Classification Search .............. 96/4, 96/7, 108, 134, 143, 147; 55/385.3, 385.6; 362/267, 294, 345, 547; 95/117, 90
See application file for complete search history.

(56) References Cited

U.S. PATENT DOCUMENTS

| 3,953,566 | A | 4/1976 | Gore .................. 264/288 |
| 4,075,679 | A | 2/1978 | Christopher et al. ........ 364/200 |
| 4,110,392 | A | 8/1978 | Yamazaki ............... 264/127 |
| 4,187,390 | A | 2/1980 | Gore .................. 174/102 R |
| 4,750,093 | A * | 6/1988 | Bals et al. ............... 362/547 |
| 4,755,917 | A * | 7/1988 | Bals et al. ............... 362/547 |
| 4,809,144 | A * | 2/1989 | Suzuki ................. 362/547 |
| 5,914,415 | A | 6/1999 | Tago ................... 55/385.4 |
| 5,997,614 | A * | 12/1999 | Tuma et al. .................. 96/4 |
| 6,210,014 | B1 | 4/2001 | Kubizne et al. ............. 362/96 |
| 6,364,924 | B1 | 4/2002 | Mashiko et al. ........... 55/385.4 |
| 6,422,729 | B1 | 7/2002 | Rohrbach et al. ........... 362/547 |
| 6,709,493 | B2 | 3/2004 | DeGuiseppi et al. ............ 96/7 |
| 2002/0170437 | A1* | 11/2002 | DeGuiseppi et al. ......... 96/134 |
| 2003/0133310 | A1* | 7/2003 | VanDuyn et al. .......... 362/547 |
| 2005/0157514 | A1* | 7/2005 | Brinkmann .............. 362/547 |

FOREIGN PATENT DOCUMENTS

JP 2003154228 5/2003
WO WO 00/47932 A1 * 8/2000

OTHER PUBLICATIONS

Statement by Richard W. Ellis, Dated Sep. 26, 2006.

* cited by examiner

*Primary Examiner*—Frank M. Lawrence
(74) *Attorney, Agent, or Firm*—Richard W. Ellis (57) ABSTRACT

In one aspect, the invention is a lighting assembly comprising a housing defining an internal space within the housing, and an ambient space surrounding the housing, a light source within the internal space; a high capacity desiccant within the internal space, the high capacity desiccant being nonregenerating at temperatures of up to about 50 degrees Celsius and about 11.0% relative humidity; and a diffusion tube having a first opening proximate to the internal space and a second opening proximate to the ambient space, the diffusion tube providing gaseous communication between the internal space and the ambient space.

45 Claims, 7 Drawing Sheets

FIG. 7

VENTING SYSTEM FOR MINIMIZING CONDENSATION IN A LIGHTING ASSEMBLY

BACKGROUND OF THE INVENTION

Excessive moisture causes damage within many lighting assemblies. For instance, electrical and electronic items may be ruined due to excessive moisture within a lamp enclosure. Examples of lighting assemblies which are subject to undesirable moisture include, for example, automotive headlamp units and other outdoor lighting assemblies where on/off cycling of a lamp within the enclosure results in moisture build-up. As used herein, the term "moisture" is intended to refer to water that is diffused or condensed, whether in liquid form or vapor form, from the ambient atmosphere.

The problem of moisture build up within lamp enclosures is particularly acute in automotive lamps. Modern vehicle head lamps, brake lamps, running lamps, turn signal lamps, fog lamps, back-up lamps and parking lamps (collectively "lamps" or "vehicle lamps") typically have one or more light bulbs located in an enclosed housing. It is critical to the effective operation of the light to prevent water, dirt, oils and the like from reaching the bulbs, the reflective surfaces, the lens or the housing. However, thermal cycling due to bulb operation, changes in the environment and vehicle operation can cause moisture to condense on the interior of the housing and inhibit light output from the lamp. Moreover, components within a lamp may be damaged by such condensation.

One known means of reducing moisture related problems is to disperse moisture by providing greater airflow across, or through, the enclosure. Thus, vent systems intended to reduce condensation often employ some means of increasing airflow through the lamp housing. However, it can be very difficult to provide sufficient airflow to reduce moisture. Moreover, attempts to increase the vent opening sizes can exacerbate problems such as contamination, etc. In general, the atmospheric air outside of a lamp housing is below the water vapor saturation point, and the air flowing through the housing has the capacity to remove condensation from the lamp housing by removing water vapor from the housing. Vent systems using this means of condensation reduction generally have vent openings in more than one location. The openings are often placed in locations where airflow past the vent opening enhances airflow through the housing. Thus, location of these vent systems can be an important consideration. However, vent systems that provide a means of increasing airflow through the lamp housing often have a negative effect on lamp performance. Specifically, these venting systems often create an opportunity for foreign materials and liquid water to enter the vehicle lighting system.

Another means of reducing moisture in an enclosure is to place a drying agent or desiccant within the enclosure. Desiccants can operate by several fundamental mechanisms including absorption, adsorption, and reaction. Absorption occurs when a substance (e.g., water vapor) penetrates the inner structure of another (the absorbent). Adsorption occurs when a substance (e.g., water vapor) is attracted and held onto the surface of another (the adsorbent). Reaction occurs when the substance (e.g., water vapor) reacts with the desiccant to form a chemical bond with water. As the terms "desiccants" or "drying agents" are used herein, they are intended to refer to any material which absorbs, adsorbs, or reacts with water vapor from the air and is thereby able to reduce the moisture in the air within a lighting enclosure.

Many desiccants will desorb or release adsorbed or absorbed moisture when heated in a process called regeneration. Such desiccants are commonly referred to as regenerating desiccants. In contrast, Non-regenerating desiccants retain adsorbed, absorbed, or reacted moisture when heated.

Regenerating Desiccants have been proposed for use in lamp enclosures. For example, U.S. Pat. No. 6,422,729 to Rohrbach et al. and U.S. Pat. No. 6,709,493 to DeGuiseppi et al., the latter commonly assigned herewith, each suggest using a regenerating desiccant to control moisture in a lamp enclosure. Rohrbach et al. teaches providing a regenerating desiccant within a vent assembly installed in a lamp. When the lamp is turned on, the heat from the bulb causes temperatures inside the housing to rise and the air within the housing to expand. The heating of the air causes its relative humidity to decrease. This hot, expanding, low humidity air is driven out of the housing through the vent and past the desiccant causing the moisture contained within the desiccant to desorb thus regenerate. When the lamp is turned off, ambient air entering the lamp is intended to be dried by contact with the regenerated desiccant. Deguiseppi et al. teaches using a diffusion tube that creates a pathway from the desiccant to the atmosphere.

Under certain conditions, particularly in cold, damp weather, desiccant regeneration can be problematic. Much of the moisture desorbed from the desiccant and the plastic components within the lamp cavity when the lamp is on, may remain in the space within the housing. Moreover, when the bulb is turned off, the air within the housing contracts and air, which may contain additional moisture, is pulled into the housing through the vent. The housing and the air within it may cool relatively rapidly compared to the desiccant itself. Because the desiccant recovers absorptive or adsorptive capacity only as it cools, the moisture that remains distributed within the housing may condense on, for example the cold surface of the lens or housing.

Non regenerating desiccants have been used in, for example, vented automotive headlamps. However, it has proven difficult to provide enough desiccant to meet the design life of most enclosures because significant amounts of moisture are present in the lamp when assembled or enter the headlamp through the venting system by moisture diffusion from the outside environment and during each cycle that the head lamp is energized and de-energized. Depending upon the environment in which the lamp is used, a non regenerating desiccant may become fully saturated after only a few months use in a vented lamp enclosure.

SUMMARY OF THE INVENTION

In one aspect, the invention is a lighting assembly comprising a housing defining an internal space within the housing, and an ambient space surrounding the housing, a light source within the internal space; a high capacity desiccant within the internal space, the high capacity desiccant being nonregenerating at temperatures of up to about 50 degrees Celsius and about 11% relative humidity; and a diffusion tube having a first opening proximate to the internal space and a second opening proximate to the ambient space, the diffusion tube providing gaseous communication between the internal space and the ambient space.

In another aspect, the invention provides a lighting assembly comprising a housing containing a light source, the housing defining an internal space within the housing, and an ambient space surrounding the housing, a first high capacity desiccant within the internal space, the high capacity desiccant being nonregenerating at temperatures of up to about 50 degrees Celsius and about 11% relative humidity, a container within the internal space, said container having an air impermeable and water vapor permeable surface and containing a second desiccant, a heat source adjacent to the air impermeable and water vapor surface such that the desiccant is heated to a temperature whereby moisture is driven from the second desiccant; and a diffusion tube having a first open end proximate to the second desiccant and a second open end proximate to the ambient space, said diffusion tube providing gaseous communication between the second desiccant and the ambient space In a further aspect, the invention provides method of reducing condensation in a lamp enclosure, the method comprising providing high capacity desiccant within said lamp enclosure, said high capacity desiccant being nonregenerating at temperatures of up to about 50 degrees Celsius and about 11% relative humidity; and providing a diffusion tube, the diffusion tube providing gaseous communication between the interior of the lamp enclosure and the surrounding atmosphere.

In yet another aspect of the present invention, a lighting assembly contains a high capacity desiccant which will absorb at least about 4 grams of water per 10 grams of high capacity desiccant when exposed to an environment of about 22 degrees Celsius and about 50 percent relative humidity for 7 days.

In a still further aspect, the invention provides a lighting assembly in which a high capacity desiccant will absorb at least about 7 grams of water per 10 grams of high capacity desiccant when exposed to an environment of about 22 degrees Celsius and about 50 percent relative humidity for 7 days.

In another aspect, the invention provides a lighting assembly including a high capacity desiccant comprising MgO and at least 5% $MgCl_2$.

In a further aspect, the invention provides a lighting assembly including a high capacity desiccant comprising 5% to 80% by weight $MgCl_2$ and at least 5% MgO; 35% to 70% by weight $MgCl_2$ and at least 5% MgO, or equal parts $MgCl_2$ and MgO.

DETAILED DESCRIPTION OF THE INVENTION

The present invention relates to systems and methods for reducing condensation in lamp enclosures. Specifically, the invention provides a unique combination of a diffusion tube and a non-regenerating high capacity desiccant. The invention has application in, for example, outdoor lighting, decorative lighting, automobile, truck, motorcycle and boat lamps, as well as other vehicle lamps and lighting applications where condensation is problematic.

The desiccants that are suitable for use in the present invention may include any suitable non-regenerating desiccant. However, non-regenerating desiccants of high absorptive capacity are preferred. As used herein, "High Capacity" with respect to desiccants means a desiccant with a 7-Day Moisture Absorbing Weight Gain of greater than 4 grams, wherein the "7-Day Moisture Absorbing Weight Gain" means the total weight of moisture in grams absorbed by 10 grams of dry desiccant when exposed to an atmosphere of 50% relative humidity and 22 degrees Celsius for 7 days. With respect to desiccants, "Dry" means any desiccant that is conditioned at 200 C for 48 hours at a relative humidity of less than 0.1% or any anhydrous desiccant compounds.

The desiccant is nonregenerating. "Nonregenerating" with respect to desiccants means a desiccant that will not lose more than 30% of its 7-Day Moisture Absorbing Weight Gain after 48 hours of drying at 50 degrees Celsius and about 11% relative humidity. As discussed above, regenerating desiccants release moisture into the lamp enclosure when heated and this moisture release may exacerbate condensation problems. Therefore, non-regenerating desiccants, which do not release moisture as temperature rises and relative humidity decreases, are preferred.

The novel combination of non-regenerating desiccant and a diffusion tube enables long condensation-free performance in lamp enclosures. However, in applications such as large lamp enclosures, high capacity desiccants are preferred. Preferably, the desiccant chosen will absorb at least 4 grams of water per 10 grams of desiccant when exposed to an atmosphere of 22 degrees Celsius and about 50 percent relative humidity for 7 days. More preferably, the desiccant chosen will absorb at least 5 grams of water per 10 grams of desiccant when exposed to an atmosphere of 22 degrees Celsius and 50 percent relative humidity for 7 days. Most preferably, the desiccant chosen will absorb at least 7 grams of water per 10 grams of desiccant when exposed to an atmosphere of 22 degrees Celsius and about 50 percent relative humidity for 7 days.

The desiccant preferably comprises an absorbent salt and can be selected, for example, from calcium chloride ($CaCl_2$), lithium chloride (LiCl), lithium bromide (LiBr), magnesium chloride ($MgCl_2$), calcium nitrate ($Ca(NO_3)$) and potassium fluoride (KF). Other salts, such as phosphorous pentoxide ($P_2O_5$), magnesium perchlorate ($Mg(ClO_4)_2$), barium oxide (BaO), calcium oxide (CaO), magnesium oxide, (MgO), calcium sulfate ($CaSO_4$), aluminum oxide ($Al_2O_3$), calcium bromide ($CaBr_2$), barium perchlorate ($Ba(ClO_4)_2$) and copper sulfate ($CuSO_4$) may also be useful. Combinations of two or more of these salts can also be advantageously used. Other compounds can also be added to the mixture to promote chemical reactions with water. Preferably, the desiccant comprises a mixture of $MgCl_2$ and MgO. More preferably, the desiccant comprises a mixture containing at least about 20% by weight $MgCl_2$ and at least about 50% by weight MgO. Still more preferably, the desiccant comprises a mixture containing at least about 30% by weight $MgCl_2$ and at least about 40% by weight MgO. Most preferably, the desiccant comprises a mixture contains about 44% by weight $MgCl_2$ and about 56% by weight MgO.

One of skill in the art will appreciate that the amount of high capacity desiccant used in a lamp enclosure will vary depending on the enclosure volume, the environment to which the lamp enclosure is exposed, the composition of the desiccant and other factors. Empirical methods can be readily used to determine the proper amount of desiccant can be empirically determined for each application.

The nonregenerating desiccant may be contained within the housing in any manner of moisture permeable containers or containers having moisture permeable portions. Preferably, the container is moisture vapor permeable and liquid impermeable. More preferably, the container comprises a polymeric material that is resistant to corrosion and degradation from exposure to salts and other chemicals.

For example, the container may be a flexible polymeric tube. The tube can be slightly to very flexible, depending on the strength of the polymer and the thickness of the walls. For most applications, the wall thickness will be between 10 and 50 mils (250–1250 micron) on average.

Preferably, the polymer comprises expanded porous polytetrafluoroethylene made according to the procedures described in U.S. Pat. Nos. 4,110,392, 4,187,390, 4,075,679 and 3,953,566. More specifically, coagulated dispersion polytetrafluoroethylene (PTFE) is lightly lubricated and extruded as a paste through an annular-die extruder. In a series of heating and stretching steps the lubricant is evaporated away and the PTFE structure is expanded such that the percent void space or porosity is finally about 30–80%. The resulting tube is sintered by heating above the crystalline melt temperature of PTFE.

For example, a tube can be made having a length and diameter appropriate for the size of the lamp enclosure and a wall thickness of about 1 mm. Typically, a tube comprising ePTFE will have a maximum pore size of up to about 3 micrometers, and a porosity of about 20 percent to about 90 percent.

Once the tube is prepared, it is sealed at one end by any suitable sealing means. For example, heating sealing can be carried out by using an adhesive such as polyethylene, or a melt-processible tetrafluoroethylene copolymer, and heating and compressing the end of the tube to result in the configuration shown in the drawings or simply fusion bonding the tube to itself. An alternate method is to seal one end by means of a plug that is snuggly fitted in the end. The tube is then filled with a high capacity, nonregenerating desiccant. The remaining open end is then sealed in a manner described above.

Figure 1:
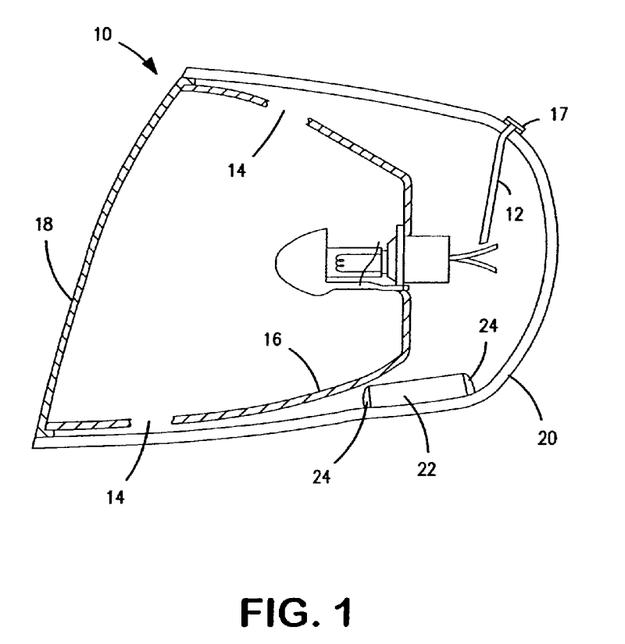
FIG. 1 is cross sectional view of a of lamp enclosure incorporating a non-regenerating desiccant and a diffusion tube.

Referring to the FIG. 1, the desiccant filled tube 22, showing fusion bonded ends 24, is placed within a lamp enclosure 10 or housing of a lighting assembly as shown. The lamp enclosure includes lens 18 attached to the front of housing wall 20. Reflector 16 includes openings 14, which allow air to circulate within the housing. Preferably, the desiccant filled tube 22 is placed within the housing behind the reflector so that it is not visible through lens 18. The venting system for a lighting assembly of the present invention shown in FIG. 1 includes a diffusion tube 12. The exposed end of the diffusion tube is covered by an optional microporous ePTFE membrane.

A diffusion tube permits air pressure equalization within the lighting assembly, while inhibiting moisture transmission through the tube. This inhibition of moisture transmission distinguishes diffusion tubes from vents. Although both vents and diffusion tubes are used to provide air inflow and outflow from the lighting enclosure, vents allow significantly more moisture transmission than diffusion tubes.

As used herein, a "Diffusion Tube" means an device for providing gaseous communication between the internal space within an enclosure and the ambient space surrounding the enclosure, which device has sufficient length, minimum cross section, tortuosity or other physical aspect that the total moisture transmission through the diffusion tube is not more than 25% of the total moisture permeation between the ambient space and the internal space. The percentage of total moisture transmission attributable to a diffusion tube is determined according to the Diffusion Tube Test described below.

Diffusion tubes may take a variety of forms. Appropriate configurations, length and cross sectional area for diffusion tubes will be determined with due consideration to enclosure volume, enclosure design, operating conditions, materials of construction, material thickness, surface area of the enclosure, etc. As those of skill in the art can appreciate, diffusion tubes are typically designed according to the following design equation:

$$\text{Flux}=\mathscr{D}_{ab}(A/L)\{P_{ambient}-P_{enclosure}\} \text{ at constant temperature}$$

$\mathscr{D}_{ab}$=Diffusion coefficient of moisture in air
A=cross-sectional area of tube (mm$^2$)
L=tube length (mm)
$P_{ambient}$=Partial pressure of moisture in ambient environment (kPa)
$P_{enclosure}$=Partial pressure of moisture inside enclosure (kPa)

Figure 2:
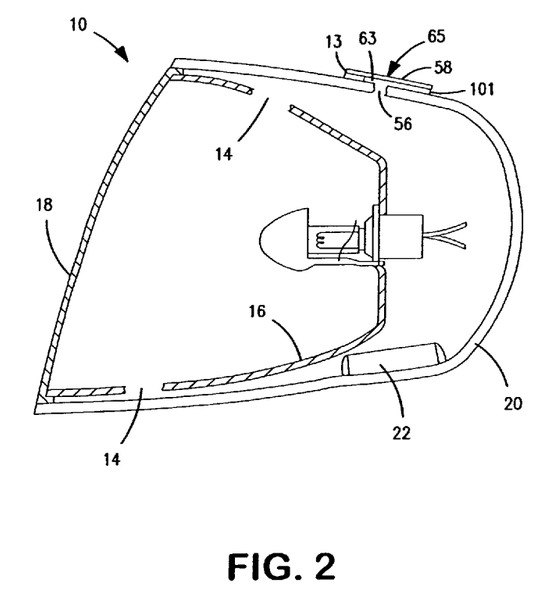
FIG. 2 is a cross section of a lamp enclosure containing a non-regenerating desiccant and an adhesive diffusion tube mounted on the outside of the housing.

FIG. 2 reflects an embodiment of the invention having an externally mounted adhesive diffusion tube that is created from a series of material layers. The drawing illustrates the housing wall 20 with a vent hole 56. Also shown is an externally mounted adhesive diffusion tube 65, wherein a channel 63 or pathway is cut through multiple layers to provide a diffusion path to the ambient atmosphere through hole 58 which connects the ambient atmosphere to the interior of the enclosure. An optional ePTFE vent cover (not shown) may be used to cover the hole 58 when desirable.

Figure 3:
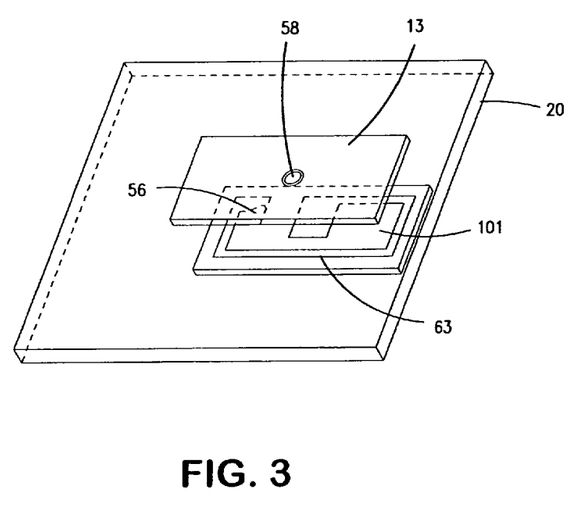
FIG. 3 is a top perspective view of the diffusion tube shown in FIG. 2.

FIG. 3 is a top exploded partial perspective view of the external diffusion tube of FIG. 2. The Figure illustrates the layers forming the diffusion tube or channel wherein an adhesive layer 10 is cut out to provide a path or channel 63 from the opening 58 in layer 13 to the opening 56 into the interior of the device.

In some lamp enclosures, particularly large lamp enclosures, the invention may incorporate a device for reducing moisture within the lamp enclosure such as the device taught in U.S. Pat. No. 6,709,493 to DeGuiseppi et al. Such devices comprise a container for holding a regenerating desiccant, an air-impermeable, water vapor-permeable layer incorporated with said container, preferably oriented on a side adjacent a heat source, such as the lamp, a diffusion tube or channel oriented within the container to provide a pathway from the desiccant to the ambient atmosphere outside the lamp enclosure. When these devices are positioned adjacent to the bulb, the heat generated by the bulb regenerates the desiccant. As used herein, the term "adjacent" means sufficiently close for heat from the bulb to reach the regenerating desiccant. Preferably, the device is oriented in a region of the lamp enclosure generally above the bulb so that heated air from the bulb contacts the device.

Figure 4A:
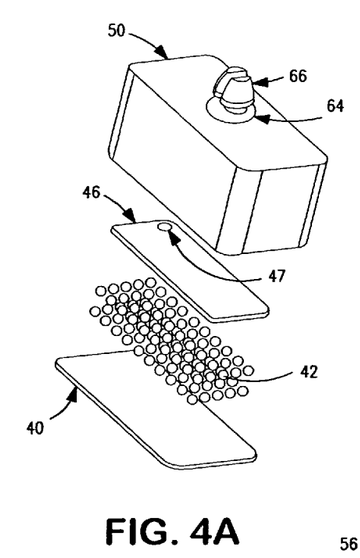
FIGS. 4a through 4c illustrate a moisture-reducing device for use with the present invention.

FIG. 4A is an exploded perspective view of a moisture reducing device which shows an air-impermeable, water vapor permeable layer 40 attached to a container 50 containing regenerating desiccant 42. The container 50 also has a diffusion tube (shown in detail in FIGS. 4B and 4C) and a mechanical attachment mechanism, in this embodiment a split-barbed compression fitting 66 and an o-ring 64.

Figure 4B:
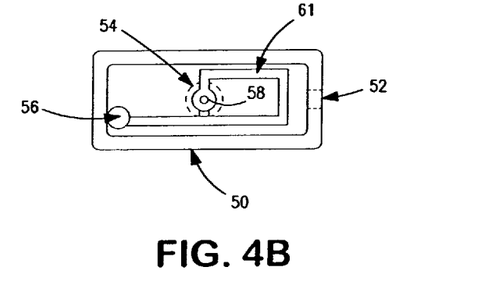
Figure 4C:
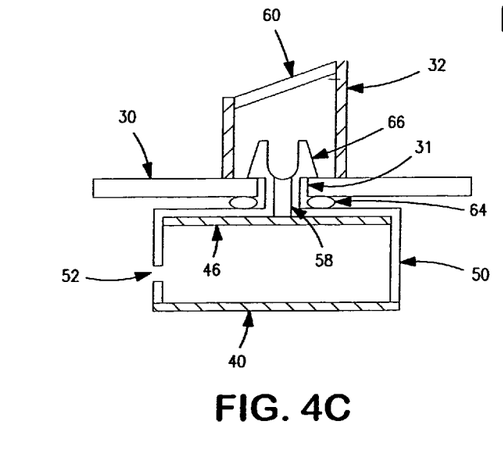

Referring to FIGS. 4B and 4C, shown are an internal perspective view of the container 50 and a side cross-sectional view, respectively, of the housing showing the diffusion tube and mechanical attachment 66 to the enclosure housing 30. The container 50 includes a channel 61 incorporated with the container wall with a first end 56 and a second end aligned with hole 58 through the container 50. A separation layer 46 is provided having a hole 47 which when placed into the container aligns with end 56, thereby providing a diffusion channel and path from the desiccant in the container to the exterior of the lamp enclosure when the device is installed in the enclosure. Installation is carried out by putting the fitting 66 through hole 31 in the enclosure housing 30. The o-ring 64 remains on the interior of the enclosure housing 30. In this embodiment, the air permeable layer 60 is located on an external vent support 32 attached to the enclosure housing 30 with an adhesive (not shown) or other attachment means.

These devices reduce moisture by the transporting air through the device, particularly during cycling of the lamp. When the lamp is on, the air in the lamp enclosure warms and expands. The expanding air enters the device through the vent hole and passes through the regenerating desiccant chamber. Optionally, the air passes through an air permeable layer covering the vent hole. The heated air continues through the device into a diffusion tube. As the temperature rises, the desiccant regenerates (i.e., dries) and releases water vapor into the air which is then expelled into the ambient atmosphere through the diffusion tube. When the lamp is turned off, the air inside the enclosure cools and contracts. Ambient air, which may contain some moisture, is drawn into the enclosure through the device, but the air is dried by the regenerated desiccant before it enters the lamp housing. To prevent the liquids such as water and the like from entering the device, an air-permeable, liquid water impermeable layer, preferably a hydrophobic layer or more preferably an oleophobic layer, is placed at the opening of the lamp enclosure where the device is positioned to contact the ambient atmosphere. A second, air-permeable layer inside the enclosure covering the internal vent hole opening may optionally be incorporated as well to assist in regulating the flow of air in the device.

Test Methods

Diffusion Tube Test

The diffusion tube test is intended to determine the contribution of moisture transmission attributable to a lamp enclosure venting system. This contribution is determined by comparing the total moisture permeation of a lamp enclosure with a vent system to an otherwise identical enclosure without the venting system. A well designed diffusion tube vent will provide minimal increase in moisture permeation when compared to the non-vented lamp.

A truck headlamp assembly from a model year 2000 Chevrolet Silverado was modified to create a reference lamp enclosure for the test. All existing vents on the light assembly were first sealed with Dow Corning RTV 832 multi-surface adhesive sealant such that the lamp enclosure would hold to 0.5 psi pressure for 5 minutes with less than a 0.05 psi loss in pressure. A 1 mm OD hole was drilled in the enclosure. A 30 gauge syringe needle was placed in the hole and sealed with Dow Corning RTV 832 multi-surface adhesive sealant. The syringe needle provides for air pressure equalization during the permeability test.

The reference lamp enclosure was conditioned in an oven (Thermolyne type B, series 9000) at about 3% relative humidity and about 80 degrees Celsius for 48 hours with bulbs and all access caps removed. The lamp was then conditioned in an environmental chamber (Blue M, Model 0. FR-361C-1) at 5% relative humidity and 38 degrees Celsius for 72 hours with bulbs and all access caps removed. The lamp was then assembled and allowed to stand in the chamber for 24 hours. The relative humidity inside the reference lamp enclosure was monitored using standard data logging equipment having a thin layer capacitive type humidity sensor. Humidity data was recorded every minute for the duration of the test. The relative humidity in the chamber was then increased to 90% at 38 degrees Celsius. The relative humidity data was then plotted.

The venting system to be evaluated was tested in a similar manner. After installing the venting system in the lamp, the lamp enclosure was conditioned for 5 days as described above. Twenty four hours after assembling the lamp enclosure the relative humidity was raised to 90% and the internal relative humidity was monitored every minute for a minimum time of 72 hours.

Several vents were evaluated by comparing the moisture permeation of lamps with such vents installed with the moisture permeation of the sealed reference lamp. The vents included a rubber tube with a 90° bend approximately 8 mm OD with a reticulated foam insert inside the tube (hereinafter an "L" tube); a push-on vent as described by U.S. Pat. Nos. 5,914,415 and 6,364,924, (hereinafter referred to as a "Mushroom Vent").

The adhesive vent tested had a 0.75 inch outside diameter and a 0.35" inside diameter and is available from WL Gore & Associates, Newark, Del. (Part Number: SMPL-AVS7); and a stainless steel diffusion vent comprising a 75 mm long stainless steel tube having an inside diameter of 0.75 mm (hereinafter, a "Diffusion Vent.")

Figure 5:
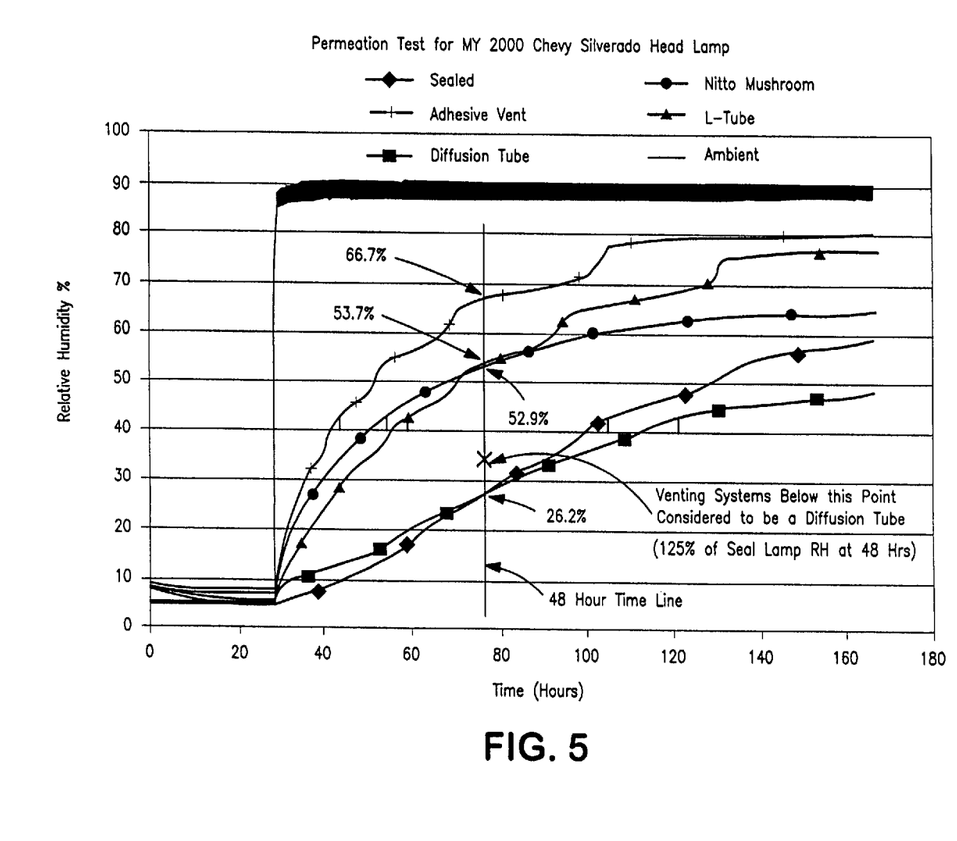
FIG. 5 is a graphical representation of the relative humidity over time within lamp enclosures having different venting systems.
Figure 6:
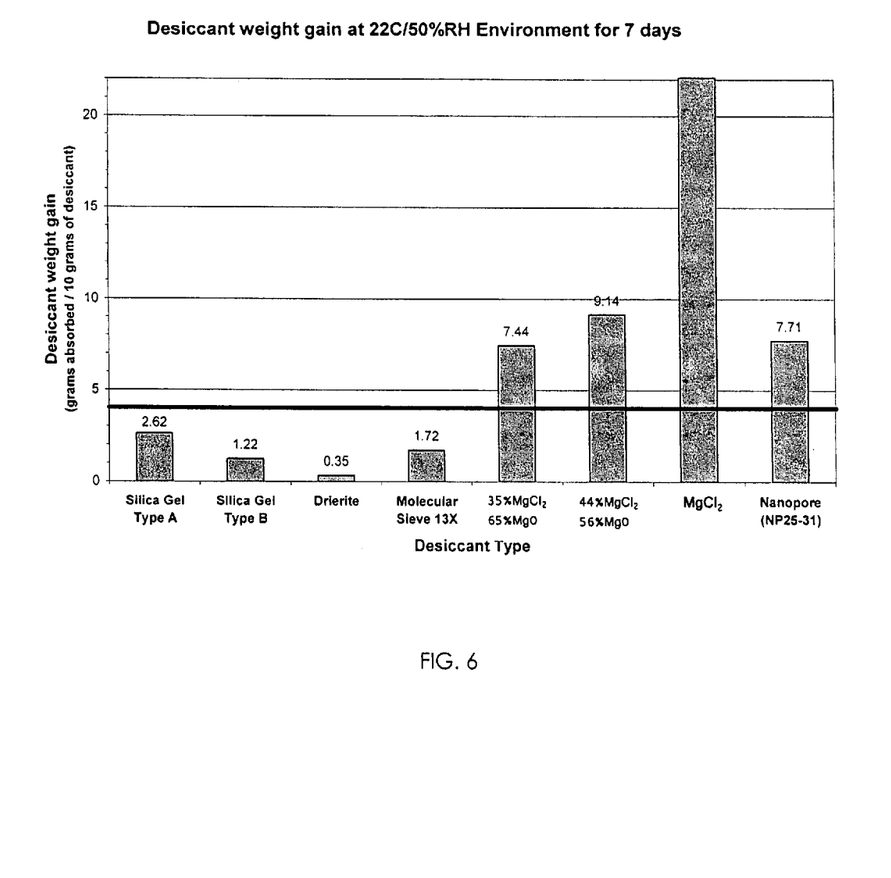
FIG. 6 is a graphical representation of the 7-Day moisture weight gain for various desiccants.
Figure 7:
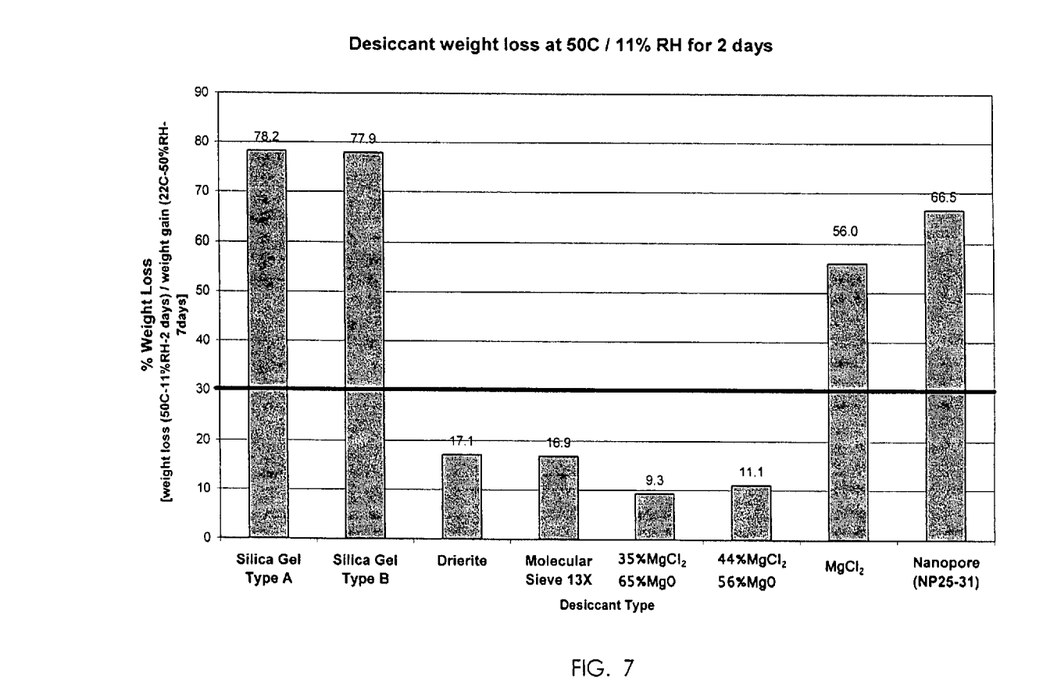
FIG. 7 is a graphical representation of the percentage moisture weight loss for various desiccants.

The graphs of relative humidity over time for the sealed reference headlamp and the headlamp with the venting system installed were compared and the data reflected in FIG. 5.

Preferably, the relative humidity profile for the lamp enclosure with the venting system is substantially similar to that of the sealed reference enclosure. If, after 48 hours, the relative humidity of the test enclosure is less than 125% of the relative humidity of the reference sealed enclosure, the venting system can be characterized as a diffusion tube.

Desiccant Capacity Test

Desiccants were initially dry. Desiccants that manage moisture by absorption or adsorption were conditioned (dried) at 200 degrees Celsius for 48 hours prior to testing; desiccants that manage moisture by chemical reaction were tested in an unreacted condition or anhydrous state (collectively such desiccants are referred to herein as "dry" desiccants). For each sample, ten grams of dry desiccant were placed in an opened aluminum 70 mm diameter×15.4 mm high weighing pan. Due to the high absorption capacity of the $MgCl_2$ salt, a 255 mm L×160 mm W×19 mm H opened stainless steel pan was used to contain the absorbed moisture. The desiccants tested were the following: Silica Gel Type A—supplied by Kaltron Inc. (Kaltron/Pettibone) of Bensenville, Ill.; Silica Gel type B—supplied by Kaltron Inc. (Kaltron/Pettibone) of Bensenville, Ill.; Drierite®—(anhydrous Calcium Sulfate) supplied by W.A. Hammond Drierite Co. of Xenia, Ohio; Molecular Sieve 13X—supplied by W.R. Grace & Co. of Baltimore, Md.; $MgCl_2$ (anhydrous 98%) supplied by Lancaster Synthesis, Inc. of Pelham, N.H.; MgO, Light Powder—supplied by Mallinckrodt Baker, Inc. of Phillipsburg, N.J.; and Nanopore (NP25-31)—supplied by Nanopore Inc. of Albuquerque, N. Mex.

All desiccant samples were exposed to a 50% (+/−5%) relative humidity environment at 22 (+/−1) degrees Celsius for 7 days. Next, the desiccant was reweighed to determine the final desiccant weight. The 7-Day Moisture Weight Gain ($W_g$), in grams of moisture per 10 grams of desiccant, is determined by subtracting 10 grams from the final desiccant weight. Samples that gained more than 4 grams of moisture per 10 grams desiccant were considered to be "High Capacity."

Desiccant Regeneration

After evaluating desiccant capacity, the samples were evaluated for regeneration. The same samples produced in the "desiccant capacity test" were then exposed to conditions of 50 degrees Celsius and about 11% relative humidity for 48 hours. The sample was then weighed to determine the moisture weight lost at 50 degrees Celsius ($W_L$). The percentage moisture weight loss after regeneration was determined by dividing the regenerated weight loss ($W_L$) by the weight gain of the desiccant following the "7 day Moisture Weight Gain Test" ($W_g$) multiplied by 100:

$$[(W_L/W_g) \times 100].$$

Samples for which the percentage of moisture weight loss exceeded 30% were considered regenerating at 50 degrees Celsius.

EXAMPLES

Example 1

A lamp housing according to the present invention was produced using the housing of a model year 2004 Saturn Ion2. Both adhesive vents were removed. The original housing included two vents, one inboard and one outboard. The out board vent hole was sealed Dow Corning RTV 832.

A diffusion tube was installed through the inboard vent hole. A 100 mm long, 1.6 mm OD, 0.75 mm ID Stainless Steel tube was sealed into the inboard vent hole using RTV 832. A 6.3 mm tall Delrin vent stand off, having a 12.7 mm OD and 7.6 mm ID was attached over the top of the tube using the RTV 832. An OLEOGARD® adhesive vent manufactured by W.L. Gore & Associates of Elkton, Md., part number VE0004WAG was placed on top of the standoff to prevent contamination or clogging of the diffusion tube.

A high capacity, nonregenerating desiccant was placed in a container and installed in the housing. A ten gram mixture of 44% $MgCl_2$ and 56% $MgO$ was prepared and immediately placed into an 8" ePTFE tube. The $MgCl_2$ was obtained from Lancaster Synthesis, Inc., and the MgO from Mallinckrodt Baker, Inc.

The ePTFE tube had a nominal ID of about 13 mm, a 1 mm wall thickness and a porosity of about 55%. Both ends of the tube were sealed by using standard ¾" transparent office stationary tape. The high capacity, nonregenerating desiccant-filled tube was placed inside the lamp behind the reflector, in a position not visible from the front of the headlamp. The lamp was then placed on a 2004 Saturn Ion2. The desiccant tubes are removed weekly and weighed.

Example 2

A second lamp housing according to the present invention was produced from a 2002 Volvo HID headlamp. All original vents were removed and the holes were sealed with RTV 832.

A moisture reducing device was installed in the housing. The device consisted of a stamped stainless steel cup (20 mm OD×6.5 mm height) with a 0.5 mm vent hole in the bottom, manufactured by Auto-Form, Inc., Waterbury, Conn. A stainless steel tube (0.75 mm ID×1.5 mm OD×125 mm L) was soldered into the bottom of the cup. The cup was filled with about 0.600 grams (±0.005 g) of Type B silica desiccant manufactured by Kaltron Inc. (Kaltron/Pettibone) of Bensenville, Ill., part number Sil 66300. To contain the desiccant, the cup was covered by a silicone rubber imbibed ePTFE Membrane prepared in the following manner:

A roll of tensilized polytetrafluoroethylene (PTFE) tape, manufacture by DeWal Industries of Sanderstown, R.I., part number 220T, that is approximately 20 cm wide is placed on the payoff of a draw down machine, passed over a steel guide, attached to clamp connected to a drive motor, then pulled onto the working surface of the machine and kept under tension by the drive motor and payoff. A draw down blade having center section machined out wherein there is a 76 micrometer clearance over the surface of the PTFE tape when the pneumatic cylinders push the draw down blade so that the edges of the draw down blade contact the working surface. Approximately 100 grams of silicone rubber, manufactured by General Electric Company, Pittsfield, Mass., part number RTV 863, is placed on the PTFE tape between the idler roll and draw down blade. The motor is started and the PTFE tape is pulled under the draw down blade at a rate of approximately 8 cm/s, applying a thin coating of the silicone rubber. After pulling approximately 80 cm of the PTFE tape, the motor is stopped and a piece of ePTFE membrane, manufactured by W.L. Gore & Associates Inc. of Elkton, Md., is carefully laid down on the newly metered silicone rubber surface, being careful to prevent air bubbles and wrinkles from forming between the silicone rubber and the ePTFE membrane. The ePTFE membrane that is used for the silicone imbibing has the following properties: isopropanol (IPA) bubble point 0.60–0.86 bar, thickness 0.064–0.089 mm, water entry pressure (WEP) minimum of 1.38 bar and filled with 7.5% by weight of carbon black. The silicone rubber imbibed ePTFE composite is then placed into a conventional oven at 150° C. for 3 to 5 minutes.

A disc of the silicone imbibed ePTFE composite measuring about 19 mm OD was placed over the opening of the cup to contain the desiccant. The retaining ring, also produced by Auto-form Inc, was then inserted to retain the silicone imbibed ePTFE membrane.

The end of the bulbshield was removed to allow the moisture reducing device to be inserted into the end of the bulbshield. The device was placed with the silicone imbibed membrane layer facing the front of the lamp. The stainless steel tube was bent to fit along the shape of the bulbshield and fed through a 3 mm OD hole drilled into the back of the reflector. A 100 mm flexible silicone tube (3.2 mm OD, 1.6 mm ID, shore A 70) obtained from McMaster-Carr, Atlanta, Ga. was connected to the stainless steel tube and fed through a 3 mm hole in the bottom of the lamp. The silicone tube is then sealed into the lamp using RTV 832. A 6.3 mm tall Delrin vent stand off, having a 12.7 mm OD and 7.6 mm ID was attached over the top of the exit location of the silicone tube using RTV 832. An OLEOGARD® adhesive vent manufactured by W.L. Gore & Associates of Elkton, Md., part number VE0004WAG, was placed on top of the standoff.

A 200 mm long piece of ePTFE tubing was filled with 10 g of the same high capacity, nonregenerating desiccant described in Example 1. Both ends of the tube were heat sealed at 375° C. and 30 psi for 10 seconds. The desiccant-filled tube was placed inside the lamp, behind the reflector so that it is not visible from the front of the lamp.

Example 3

A housing was assembled using a modified enclosure from a model year 2000 Chevy Silverado in which all original housing vents were sealed with Dow Corning RTV 832.

A 6.5 mm hole was drilled directly above the low beam bulb. An adhesive diffusion tube was constructed and placed over the hole in the housing. The adhesive diffusion tube consisted of a 27.5 mm×13.3 mm×0.5 mm layer of adhesive having a 1.5 mm wide×48 mm channel cut within it to provide a pathway for air attached to the housing and covered with a polymeric film having a 2.7 mm diameter opening therein to form an diffusion tube exit. One end of the channel in the adhesive is placed over the hole in the housing and the opening in the polymeric film is placed over the opposite end of the channel.

An OLEOGARD® adhesive vent manufactured by W.L. Gore & Associates of Elkton, Md., part number VE0004WAG, was placed on the exit of the die cut diffusion tube exit.

A tube containing high capacity nonregenerating desiccant prepared as described in Example 2 was placed in the high beam area of the lamp. The desiccant-filled tube was placed behind the reflector so that it would not be visible from the front of the lamp.

What is claimed:

1. A lighting assembly comprising:
   a) a housing defining an internal space within said housing, and an ambient space surrounding said housing;
   b) a light source within the internal space;
   c) high capacity desiccant within the internal space, said high capacity desiccant being nonregenerating at temperatures of up to about 50 degrees Celsius and about 11% relative humidity; and
   d) a diffusion tube having a first opening proximate to the internal space and a second opening proximate to the ambient space, said diffusion tube providing gaseous communication between the internal space and the ambient space.

2. The lighting assembly of claim 1, in which said high capacity desiccant will absorb at least about 4 grams of water per 10 grams of high capacity desiccant when exposed to an environment of about 22 degrees Celsius and about 50 percent relative humidity for 7 days.

3. The lighting assembly of claim 1, in which said high capacity desiccant will absorb at least about 7 grams of water per 10 grams of high capacity desiccant when exposed to an environment of about 22 degrees Celsius and about 50 percent relative humidity for 7 days.

4. The lighting assembly of claim 1, in which said high capacity desiccant comprises MgO and at least 5% MgCl2.

5. The lighting assembly of claim 1, in Which said high capacity desiccant comprises 5% to 80% by weight MgCl2 and at least 5% MgO.

6. The lighting assembly of claim 1, in which said high capacity desiccant comprises 35% to 70% by weight MgCl2 and at least 5% MgO.

7. The lighting assembly of claim 1, in which said high capacity desiccant comprises approximately equal parts MgCl2 and MgO.

8. The lighting assembly of claim 1, further comprising a microporous membrane covering at least one opening of said diffusion tube.

9. The lighting assembly of claim 8, in which said microporous membrane is ePTFE.

10. The lighting assembly of claim 9, in which said ePTFE membrane is oleophobic.

11. The lighting assembly of claim 1 in which the diffusion tube comprises; an adhesive layer having at least one opening therein, said opening located over a vent hole in said lighting assembly, the layer of adhesive having a channel cut within it to provide a pathway for air, the layer attached to the housing and covered with a polymeric film having an opening therein to form an diffusion tube exit.

12. A lighting assembly comprising:
   a) a housing containing a light source, said housing defining an internal space within said housing, and an ambient space surrounding said housing;
   b) first desiccant within the internal space, said first desiccant being of high capacity and being nonregenerating at temperatures of up to about 50 degrees Celsius and about 11% relative humidity;
   c) a container within the internal space, said container having an air impermeable and water vapor permeable surface and containing second desiccant;
   d) a heat source adjacent to the air impermeable and water vapor surface such that the second desiccant is heated to a temperature whereby moisture is driven from the second desiccant; and
   e) a diffusion tube having a first open end proximate to the second desiccant and a second open end proximate to the ambient space, said diffusion tube providing gaseous communication between the second desiccant and the ambient space.

13. The lighting assembly of claim 12, in which the light source and said heat source are the same.

14. The lighting assembly of claim 12, in which said high capacity desiccant will absorb at least about 4 grams of water per 10 grams of high capacity desiccant when exposed to an environment of about 22 degrees Celsius and about 50 percent relative humidity for 7 days.

15. The lighting assembly of claim 12, in which said high capacity desiccant will absorb at least about 7 grams of water per 10 grams of high capacity desiccant when exposed to an environment of about 22 degrees Celsius and about 50 percent relative humidity for 7 days.

16. The lighting assembly of claim 12 in which said high capacity desiccant comprises MgO and at least 5% MgCl2.

17. The lighting assembly of claim 12, in which said high capacity desiccant comprises 5% to 80% by weight MgCl2 and at least 5% MgO.

18. The lighting assembly of claim 12, in which said high capacity desiccant comprises 35% to 70% by weight MgCl2 and at least 5% MgO.

19. The lighting assembly of claim 12, in which said high capacity desiccant comprises approximately equal parts MgCl2 and MgO.

20. The lighting assembly of claim 12, further comprising a microporous membrane covering at least one opening of said diffusion tube.

21. The lighting assembly of claim 20, in which said microporous membrane is ePTFE.

22. The lighting assembly of claim 21, in which said ePTFE membrane is oleophobic.

23. The lighting assembly of claim 12 in which the diffusion tube comprises; an adhesive layer having at least one opening therein, said opening located over a vent hole in said lighting assembly, the layer of adhesive having a channel cut within it to provide a pathway for air, the layer attached to the housing and covered with a polymeric film having an opening therein to form an diffusion tube exit.

24. A method of reducing condensation in a lamp enclosure, the method comprising:
  a) providing high capacity desiccant within said lamp enclosure, said high capacity desiccant being nonregenerating at temperatures of up to about 50 degrees Celsius and about 11% relative humidity; and
  b) providing a diffusion tube, said diffusion tube providing gaseous communication between the interior of the lamp enclosure and the surrounding atmosphere.

25. The method of reducing condensation in a lamp enclosure of claim 24, in which said high capacity desiccant will absorb at least about 4 grams of water per 10 grams of high capacity desiccant when exposed to an environment of about 22 degrees Celsius and about 50 percent relative humidity for 7 days.

26. The method of reducing condensation in a lamp enclosure of claim 24, in which said high capacity desiccant will absorb at least about 7 grams of water per 10 grams of high capacity desiccant when exposed to an environment of about 22 degrees Celsius and about 50 percent relative humidity for 7 days.

27. The method of reducing condensation in a lamp enclosure of claim 24, in which said high capacity desiccant comprises MgO and at least 5% MgCl2.

28. The method of reducing condensation in a lamp enclosure of claim 24, in which said high capacity desiccant comprises 5% to 80% by weight MgCl2 and at least 5% MgO.

29. The method of reducing condensation in a lamp enclosure of claim 24, in which said high capacity desiccant comprises 35% to 70% by weight MgCl2 and at least 5% MgO.

30. The method of reducing condensation in a lamp enclosure of claim 24, in which said high capacity desiccant comprises approximately equal parts MgCl2 and MgO.

31. The method of reducing condensation in a lamp enclosure of claim 24, further comprising a microporous membrane covering at least one opening of said diffusion tube.

32. The method of reducing condensation in a lamp enclosure of claim 31, in which said microporous membrane is ePTFE.

33. The method of reducing condensation in a lamp enclosure of claim 32, in which said ePTFE membrane is oleophobic.

34. The lighting assembly of claim 26 in which the diffusion tube comprises; an adhesive layer having at least one opening therein, said opening located over a vent hole in said lighting assembly, the layer of adhesive having a channel cut within it to provide a pathway for air, the layer attached to the housing and covered with a polymeric film having an opening therein to form an diffusion tube exit.

35. A vehicle lighting assembly comprising:
  a) a housing containing a light source, said housing defining an internal space within said housing and an ambient space surrounding said housing;
  b) desiccant disposed within the internal space, said desiccant comprising at least about 20% by weight MgCl2 and at least 5% MgO;
  c) a diffusion tube having a first open end proximate to the internal space, and a second open end proximate to the ambient space, said diffusion tube providing gaseous communication between the internal space and the ambient space.

36. The automotive lighting assembly of claim 35, further comprising a microporous membrane covering at least one opening of said diffusion tube.

37. The automotive lighting assembly of claim 36, in which said microporous membrane is ePTFE.

38. The automotive lighting assembly of claim 37, in which said ePTFE membrane is oleophobic.

39. The lighting assembly of claim 35 in which the diffusion tube comprises; an adhesive layer having at least one opening therein, said opening located over a vent hole in said lighting assembly, the layer of adhesive having a channel cut within it to provide a pathway for air, the layer attached to the housing and covered with a polymeric film having an opening therein to form an diffusion tube exit.

40. An automotive lighting assembly comprising:
  a) a housing containing a light source, said housing defining an internal space within said housing and an ambient space surrounding said housing;
  b) first desiccant disposed within the internal space, said first desiccant comprising at least about 20% MgCl2 by weight and at least 5% MgO;
  c) a container within the internal space, said container having an air impermeable and water vapor permeable surface and containing second desiccant;
  d) a heat source adjacent to the air impermeable and water vapor permeable surface of said container such that the second desiccant is heated to a temperature whereby moisture is driven from the second desiccant; and
  e) a diffusion tube having a first open end proximate to the second desiccant and a second open end proximate to the ambient space, said diffusion tube providing gaseous communication between the second desiccant and the ambient space.

41. The lighting assembly of claim 40, in which the light source and said heat source are the same.

42. The lighting assembly of claim 40, further comprising a microporous membrane covering at least one opening of said diffusion tube.

43. The lighting assembly of claim 42, in which said microporous membrane is ePTFE.

44. The lighting assembly of claim 43, in which said ePTFE membrane is oleophobic.

45. The lighting assembly of claim 40 in which the diffusion tube comprises; an adhesive layer having at least one opening therein, said opening located over a vent hole in said lighting assembly, the layer of adhesive having a channel cut within it to provide a pathway for air, the layer attached to the housing and covered with a polymeric film having an opening therein to form an diffusion tube exit.

* * * * *